UNITED STATES PATENT OFFICE.

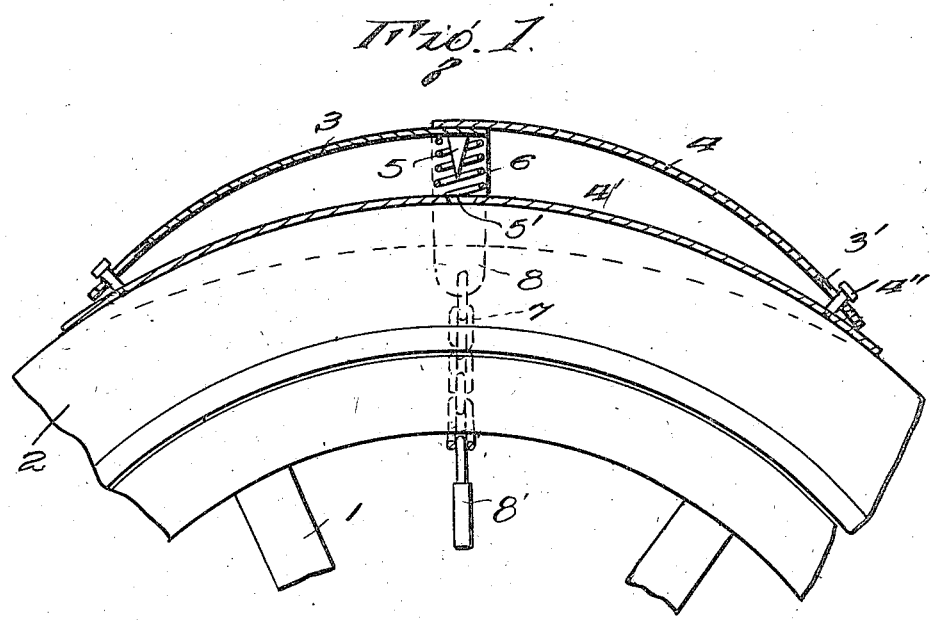
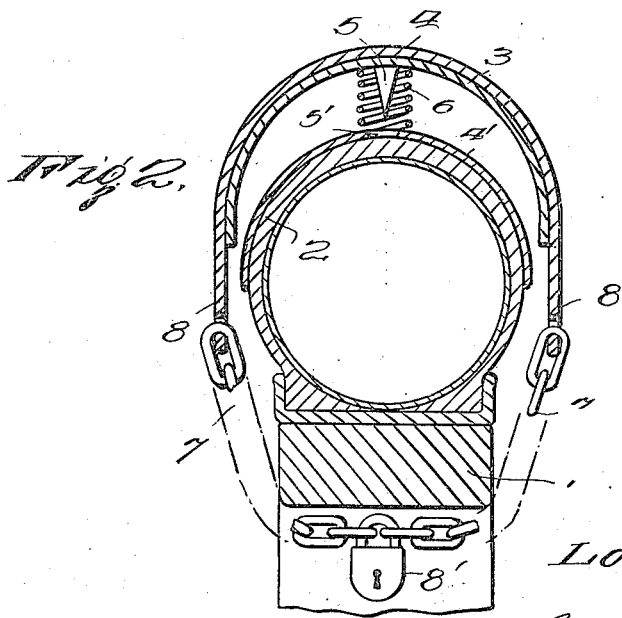

LOUIS WEBER, OF JUDSON, NORTH DAKOTA.

VEHICLE-PROTECTING DEVICE.

1,283,382.  Specification of Letters Patent.  Patented Oct. 29, 1918.

Application filed April 5, 1918. Serial No. 226,939.

*To all whom it may concern:*

Be it known that I, LOUIS WEBER, a citizen of the United States, residing at Judson, in the county of Morton and State of North Dakota, have invented certain new and useful Improvements in Vehicle-Protecting Devices, of which the following is a specification.

This invention relates to new and useful improvements in a device for preventing the unauthorized use of a vehicle and more particularly my invention resides in the novel attachment adapted to be applied to the tread portion of a pneumatic tire, which will puncture the said tire upon use of the vehicle, hence, rendering the unauthorized use obvious.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a side elevation showing my attachment applied, and

Fig. 2 is a transverse section through the same.

In describing my invention, I shall refer to the drawings in which similar reference characters designate corresponding parts throughout the several views.

The numeral 1 designates a part of a vehicle wheel of the conventional type which is provided with a pneumatic tire 2 on the outer edge thereof, to which my safety attachment is adapted to be applied. The safety attachment is detachably connected with the tread portion of the pneumatic tire, and in use is adapted to puncture said tire upon the unauthorized use of the vehicle. The attachment is formed of a pair of sections 3 and 4, substantially U-shaped in cross section, said sections overlapping at their inner ends as clearly shown in Fig. 1 of the drawings. The section 3 which is called the inner section, is provided adjacent its inner end on its inner side with a projecting pin 5 that is normally spaced from the tread portion of the tire by a coil spring 6 which surrounds the same, said coil spring having one end engaged with said section 3 while the other end normally projects beyond the point of the pin, and is engageable with the top face of a base plate 4'. Said base plate 4' is also U-shaped in cross section, being provided with an opening 5' located at a point opposite the point of the pin 5 so that when plates 3 and 4 are depressed the pin will be forced through said opening 5 and puncture the tire. Said base plate 4' is secured to the sections 3 and 4 by means of pins 4" slidably engaged with said sections through slots 3' formed in said sections. This sliding engagement compensates for the relative movement of sections 3 and 4 when they are depressed.

The device is detachably connected with the tire by means of a pair of chains 7 which have one end connected with projecting ears 8 on the outer section 4 adjacent the inner edges thereof, and said chains are adapted to be securely locked around the inner side of the rim of the tire, being held in locked position by some fastening means, preferably a padlock 8' as is clearly shown in the drawings. This means will securely hold the device in position on the tire, and will prevent it from being removed by any person except the user.

In operation, when the operator leaves the vehicle, the device is adapted to be positioned on the tire at some point around the same, preferably on the front side thereof where it will quickest come into engagement with the ground upon the operation of the vehicle. The device is positioned thereon by securing the holding chains around the inner side of the rim of the wheel and locking their inner ends by a padlock as has been herein described. This will position the sections of the tread portion of the tire and the pin 5 will have its point spaced from the tire by the coil spring 6. This is normal position of the device and upon unauthorized use of the vehicle when the shoe formed by the sections engages the ground, it is obvious that the sections will slide one within the other and the pin will be forced inwardly to puncture the tire. The coil spring of course will be compressed and allow the puncturing action to take place.

This device renders instantly obvious the unauthorized use of the vehicle. The tires, as soon as they are punctured will be deflated and obviously the vehicle would not run upon the rims so that it is easily seen that the operator has not the right to drive the vehicle. It will not only render obvious the unauthorized use, but will also prevent the vehicle from being driven any considerable distance owing to the tires being deflated. The device may be attached to one wheel or a number of devices may be employed one being connected with each of the wheels.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:

1. The combination with a vehicle wheel having a pneumatic tire, and means detachably connected with the tread portion of the tire to puncture the same upon movement of the wheel.

2. A protecting device of the class described including a shoe engageable with the tread portion of a pneumatic tire, and a pin carried by said shoe adapted to puncture the tire when the shoe engages the ground.

3. A protecting device of the class described comprising a shoe engageable with the tread portion of a pneumatic tire, a pin carried by said shoe, and means for normally spacing the point of the pin from the tire.

4. A protecting device of the class described comprising a shoe engageable with the tread portion of a pneumatic tire, a pin carried by said shoe and projecting inwardly toward the tire, and a coil spring surrounding the pin and projecting beyond the point thereof to normally space the same from the tire.

5. A protecting device of the class described comprising a shoe formed of a pair of interengageable U-shaped sections, said sections adapted for engagement with the tread portion of a pneumatic tire, a pin carried by the inner side of the inner section at the interengaged portion thereof, and a coil spring surrounding said pin to normally hold the same from the tire.

6. A protecting device of the class described comprising a shoe formed of a pair of interengageable U-shaped sections adapted for engagement with the tread portion of a pneumatic tire, a pin carried by the inner side of the inner section at the interengaged portion thereof, a coil spring surrounding said pin to normally hold the same disengaged from the tire, and means for releasably connecting said shoe to the tire.

In testimony whereof I affix my signature hereto.

LOUIS WEBER.